United States Patent
Anetseder, Sr. et al.

[11] 3,885,152
[45] May 20, 1975

[54] METHOD OF AND APPARATUS FOR DETECTING LIGHT AND CONTROLLING JALOUSIES OR THE LIKE

[75] Inventors: Leopold Anetseder, Sr.; Leopold Anetseder, Jr., both of Munich, Germany

[73] Assignee: Sun-Sor GmbH, Augsburg, Germany

[22] Filed: Sept. 24, 1973

[21] Appl. No.: 400,057

[30] Foreign Application Priority Data
June 1, 1973 Germany............................ 2327837

[52] U.S. Cl. .................... 250/235; 250/215; 160/5; 49/82
[51] Int. Cl. .............................................. H01j 3/14
[58] Field of Search ........ 250/203, 235, 215; 49/82; 160/5; 240/DIG. 6

[56] References Cited
UNITED STATES PATENTS

| | | |
|---|---|---|
| 3,064,131 | 11/1962 | Brown............................ 250/203 R |
| 3,098,152 | 7/1963 | Von Mathes .................. 250/233 X |
| 3,239,672 | 3/1966 | Gabloffsky..................... 250/233 X |
| 3,371,214 | 2/1968 | Berryman ......................... 250/233 |
| 3,733,493 | 5/1973 | McClleland...................... 250/233 |

*Primary Examiner*—Walter Stolwein
*Attorney, Agent, or Firm*—Karl F. Ross; Herbert Dubno

[57] ABSTRACT

A photosensitive surface is enclosed behind a wall formed with a vertically open slit which forms with the surface a vertical angle of 80°. This slit is open about 3° and is displaced horizontally past the surface through at least 150° so as to let parallel rays of sunlight fall onto this surface and suppress diffuse nonparallel ground light. The wall can be part of a cylindrical or frustoconical element rotated about a fixed photosensitive surface, e.g., a photoresistor, photocell, or photodiode, which is used to control an awning, roller blinds, or the like.

12 Claims, 15 Drawing Figures

METHOD OF AND APPARATUS FOR DETECTING LIGHT AND CONTROLLING JALOUSIES OR THE LIKE

FIELD OF THE INVENTION

The present invention relates to a system for detecting light and controlling a load according to the light level detected. More particularly this invention concerns a light-sensitive control for awnings, blinds, shutters, roller blinds, and the like.

BACKGROUND OF THE INVENTION

Light-sensitive control systems are known which usually rely on a photoresistor, photodiode, or photocell which produces a resistance, current, or voltage difference proportional to the intensity of light striking its light-sensitive surface. This output is fed to a relay so that when the light level crosses a predetermined threshold the relay opens or closes to operate the motor that displaces the jalousies, roller blinds, or the like. As a rule a time delay of at least 2 minutes is provided between the trigger and the relay so that temporary weather or environmental changes do not actuate the load or cause the device to operate too frequently and consequently to wear out rapidly.

The main problem with such devices is in distinguishing between the diffuse ground light which is reflected from buildings, the ground, and the like, and the parallel rays of sunlight which originate directly from the sun. The ground light changes according to season, time of day, cloudiness, sizes and shapes of surrounding structures, and the reflectivity of these neighboring structures as well as of any ground cover such as snow or water. The sunlight intensity, only, should be determinative when jalousies or the like are to be set. It is common to have ground or background light which rises to a level of 30,000 lux, whereas morning sun, for instance, might only have a level of 3,000 lux. This latter light level should actuate the control, whereas the higher ground-light level should not. Thus a ground light suppression factor $(d_0)$ of 10 (30,000 lux/3,000 lux) is necessary if the control is to trip with weak morning light but not with bright midday ground light.

The sunlight irradiates the photosensitive surface of the control through a window which is open both horizontally (aperture angle $\alpha$) and vertically (aperture angle $\beta$). Clearly the light intensity on a surface is proportional to the angle of incidence of the rays upon the surface; therefore this intensity is proportional to $\cos \alpha \cdot \cos \beta$. This should be clear from the fact that a light source lying directly above the surface will throw the most light on a surface ($\cos 90° = 1.0$) and a source whose rays are parallel to the surface will not irradiate it at all ($\cos 0° = 0.0$). This gives a necessary ground light suppression factor $d_{nrc}$ equal to $d_0/(\cos\alpha \cdot \cos\beta)$, or $10/(\cos\alpha \cdot \cos\beta)$.

In conventional systems it is difficult to control the threshold of the apparatus, especially in view of the above-described difficulty with suppression of ground light. The common solution has been to provide the light-sensitive element deep within an upright date, so that only light from the sky can fall on it. In order to collect sufficient light it is known in these arrangements to use a collecting lens. In this manner the horizontal and vertical angles, $\alpha$ and $\beta$, respectively, are limited. The collimating tube is fixed so that it is directed at the sky, usually generally to the south when used in the Northern Hemisphere. As a rule the angle $\alpha$ must be equal to at least 150° and angle $\beta$ must be equal to at least 80°, so that the entire arrangement must be fairly complicated and expensive. Even the best of such devices operates with a ground-light suppression which is often far from satisfactory and requires periodic readjustment to compensate for seasonal light changes.

OBJECTS OF THE INVENTION

It is therefore an object of the present invention to provide an improved light-operated control of the above-described general type.

Another object is the provision of such a device which is inexpensive to manufacture and which overcomes the above-given disadvantages.

A further object is to provide a sunlight detector which has a high ground-light suppression capability.

SUMMARY OF THE INVENTION

These objects are attained according to this invention in a device wherein the photosensitive surface is contained in a housing which is completely closed except for a window formed in a wall which is displaceable to move the window past the surface. The window is vertically elongated and the wall is displaced horizontally with this window parallel to the surface through an angle $\alpha$ equal to at least 150°. In this manner it is possible to sweep the desired sector without exposing the surface constantly to a great deal of diffuse light. It has been found to be possible in such a system to attain a ground-light suppression factor in excess of 60, that is more than six times larger than has been hitherto readily attainable.

In accordance with a further feature of this invention the window is rotated about an upright axis. This is achieved either by forming the window in a sleeve surrounding a fixed photosensitive surface, or by rotating both the surface and the window through a predetermined arc.

Such an arrangement allows the photosensitive surface to be irradiated through a slit narrower than 1 mm so that ground light is strongly suppressed without suppressing parallel sunlight appreciably.

According to another feature of the present invention the apparatus is provided with a plurality of such surfaces equispaced around a central axis and each effective to sweep and scan a respective arc of the sky. In this manner a full circle may be scanned so that non-uniformly lighted regions can be accurately scanned.

DESCRIPTION OF THE DRAWING

The above and other objects, features, and advantages of the invention will become more readily apparent from the following description, reference being made to the accompanying drawing in which.

SPECIFIC DESCRIPTION

Figure 1:
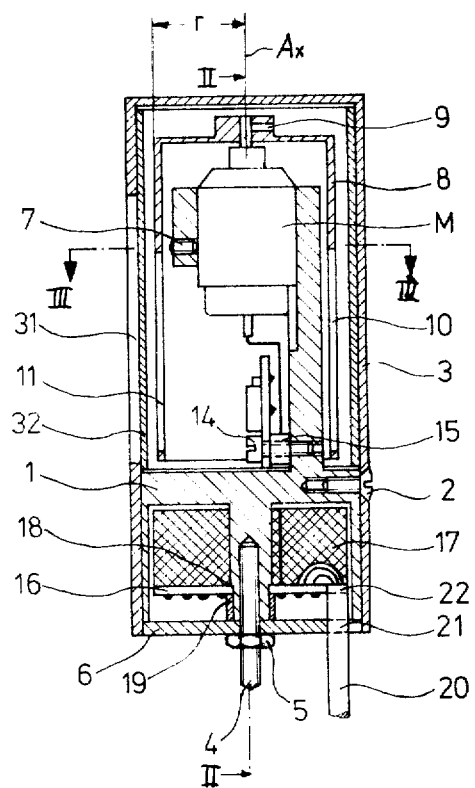
FIG. 1 is a vertical section through a first embodiment of the device according to the present invention.
Figure 2:
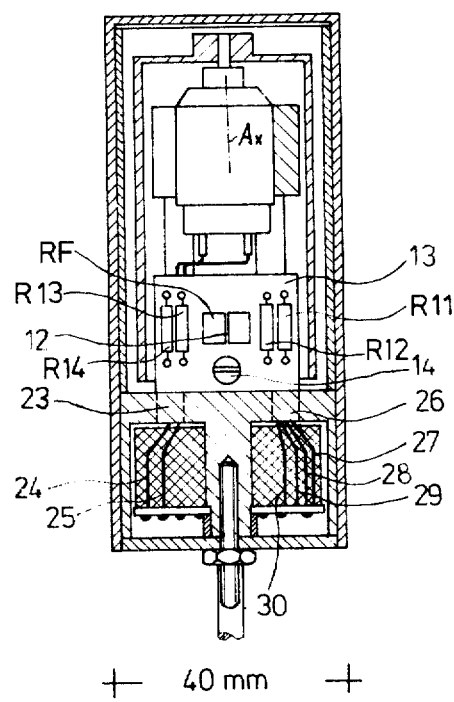
FIGS. 2 and 3 are sections taken along lines II — II and III — III, respectively, of FIG. 1.
Figure 3:
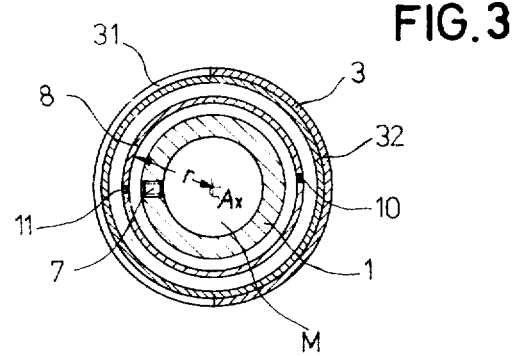

FIGS. 1 – 3 show an apparatus having a central support 1 to which is secured a cover sleeve 3 by means of a screw 2. A threaded pin 4 projecting from the bottom of the support 1 affixes a cover disk 6 to it by means of a nut 5. A motor M secured by a screw 7 to the support 1 has a shaft 9 which defines an axis Ax and carries a shutter tube 8 so that rotation of this shaft 9 rotates the shutter tube 8 about the axis A, both the tube 8 and the sleeve 3 being cylindrical and concentric with axis A. The shutter tube 8 is formed with a pair of axially extending diametrically opposed slits 10 and 11 each having a width of 0.8 mm. The tube 8 has a radius $r$ of 15 mm and the tube 3 has a radius of 20 mm.

A photoresistor RF has a planar light-sensitive surface 12 and is carried (i.e., soldered as are the other electronic components) on a small printed-circuit board 13 secured by a screw 14 to the support 1, with a spacer 15 holding the board 13 in such a position that the surface 12 lies just on the axis Ax.

A control-circuit board 16 is held against a shoulder 18 on the bottom of the support by a spacer 19 and carries an integrated circuit indicated at 17 and described in greater detail below with reference to FIG. 8. A weatherproof connecting cable 20 passes through a notch 21 in the cover disk 6 and through a similar notch 22 in the board 16 and has its conductors soldered to the board 16 at appropriate locations. Conductors 23 and 25 as well as conductors 27 – 30 pass through respective holes 23 and 26 in the support 1 and are connected to the Wheatstone measuring bridge formed by the photoresistor RF and resistors R11 – R13 along with balance resistor R14.

The cover sleeve 3 is formed with a window 31 whose dimensions are described below and which is lined with a transparent synthetic-resin or glass sleeve 32 which protects the interior of the device from the elements.

Figure 4:
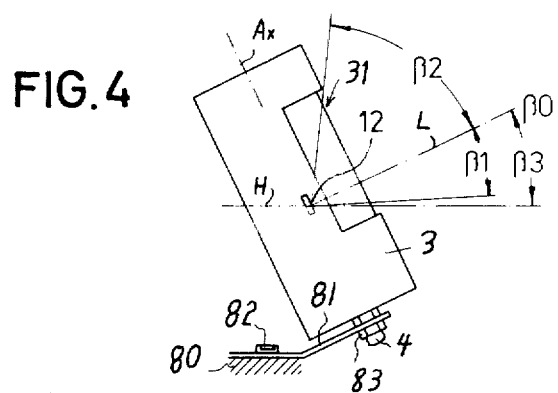
FIG. 4 is a side elevational view illustrating the operating position of the apparatus of FIGS. 1 - 3.

FIG. 4 shows how the entire unit is secured to a fixed support 80 by means of a bracket 81 fixed to this support by a screw 82 and to the pin 4 by a nut 83 so that the axis Ax of the device is inclined to a horizontal plane H by 30°. In this manner the planar light-sensitive surface 12 is also inclined at 30° to the horizontal. The surface 12 is directed so that a perpendicular L to this surface extends at an angle $\beta 3 = 25°$ to the horizontal. The window 31 is so dimensioned that light which is directly overhead, therefore at an angle $\beta 2 = 60°$ to line L, can fall on the surface 12, as can light which is almost flat or at an angle $\beta 1 = 20°$ below the line L. Thus the window is open through an aperture of 80° with respect to the surface 12 in a vertical plane through line L and axis Ax.

The intensity of the light falling on a planar surface is, as explained above, proportional to the cosine of the angle that the light rays include with the surface. When the angle of impingement is 90° (cosine 90°= 1.0) its intensity is at a maximum, whereas when the angle of impingement is 0° (cos 0° = 0.0) none of the light strikes the surface. Thus a surface in the path of 100 lux of light from a source directly overhead, that is irradiating the surface with light rays at 90° to the surface, will only receive 86.7 lux when the source is moved to 60°, and will only receive 50 lux with the source at 30°, since cos 30° = 0.867 and cos 60° = 0.50.

Figure 5:
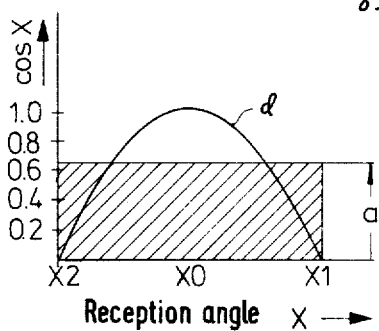
FIGS. 5, 6 and 7 are diagrams illustrating principles of the present invention.

FIG. 5 illustrates at curve $d$ the light-intensity — lux per unit of surface area — falling on the surface 12. The ordinate indicates the relative light intensity on a scale of 0.0 to 1.0 corresponding to the cosine of the light-impingement angle indicated on the abscissa, with XO indicating perpendicular impingement and X1 and X2 indicating impingement 90° offset in either direction from X0 or 0°. The average light intensity is shown to be equal to the hatched area having a height $a$ corresponding to an intensity of 0.637. The area of the hatched area is equal to the area under the curve $d$, or the integral of this curve.

Figure 6:
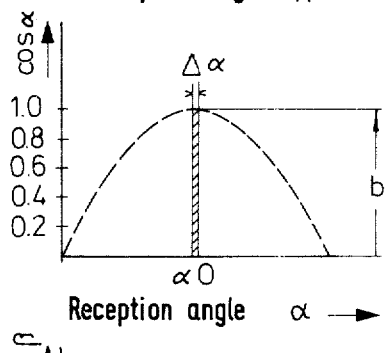

The slits 10 and 11 only allow a small portion of the outside light to fall onto the surface 12. FIG. 6 shows how with slots 10 and 11 only open through a very small angle $\Delta\alpha$ the average light intensity is equal to $b$ which is almost equal to 1.0. The ratio of the width of the slits 10 and 11 to the circumference of sleeve 8 is equal to:

$$0.8 \text{ mm}/2\pi \cdot 15 \text{ mm} = 1/120.$$

Thus angle $\delta\alpha = 360° \times 1/120 = 3°$.

The relative light intensities shown by the hatched areas in FIGS. 5 and 6 are compared to give a horizontal ground-light suppression factor $d_H$ as follows:

$$d_H = 180° \cdot a/\Delta\alpha \cdot b = 180 \times 0.637/3.1 = 38.$$

This result is much higher than has ever been achieved with any conventional arrangement using masking of the photosensitive element. Thus the horizontal reception is extremely acute since the surface 12 only receives light that is directly perpendicular to itself.

Figure 7:
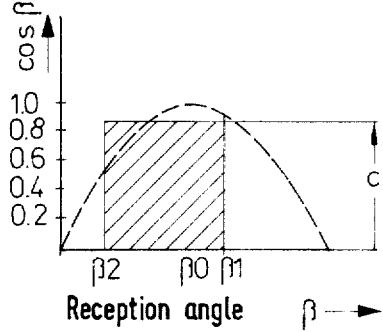

In the opposite direction, as shown by FIG. 7 the light received is shown in the hatched area lying to either side of $\beta 0$ which corresponds to line L. The average intensity here is equal to 0.87, again much higher than the intensity $a$ of light received from a fully exposed surface. The vertical ground-light suppression factor $d_V$ is therefore equal to:

$$d_V = 180° \cdot a/(\beta 1 + \beta 2)c = 180 \times 0.637/(20+60 \cdot 0.87 = 1.65.$$

The combined base light suppression factor $d_W$ is therefore:

$$d_W = d_H \cdot d_V = 38 \times 1.65 = 62.5.$$

This is many times higher than has been hitherto obtainable.

Using the above figures and taking the necessary suppression factor $d_{nec}$ to be equal to $10/\cos\alpha\cos\beta$ as mentioned above it is possible to calculate the maximum possible horizontal angle $\alpha$, allowing for a fixed angle $\beta 1$ of 20° for a weak evening or morning sun. Thus:

$$d_{nec} = d_W = 10/\cos\alpha\cos 20° = 62.5, \text{ given}$$

$$\cos\alpha = 10/62.5 \cos 20° = 0.17, \text{ so that}$$

$$\alpha = 80°.$$

Therefore, with slits 10 and 11 measuring 0.8 mm wide on a radius $r = 15$ mm and having a vertical opening of 80° equal to β1 + β2, a horizontal sweep of 160° equal to ± 80° is used. These angles correspond to the area which is swept by the photosensitive element 12. The window 31 is itself open 180° (See FIG. 2) but the angle α only corresponds to the deviation to either side of the central position of the slots 10 or 11 which still is effective on the surface 12. Thus with the sun at angle β1 the sweep will have to be through 160° to obtain the desired sensitivity and suppression of ground light. At times when the sun is higher a smaller sweep angle would suffice.

Figure 8:
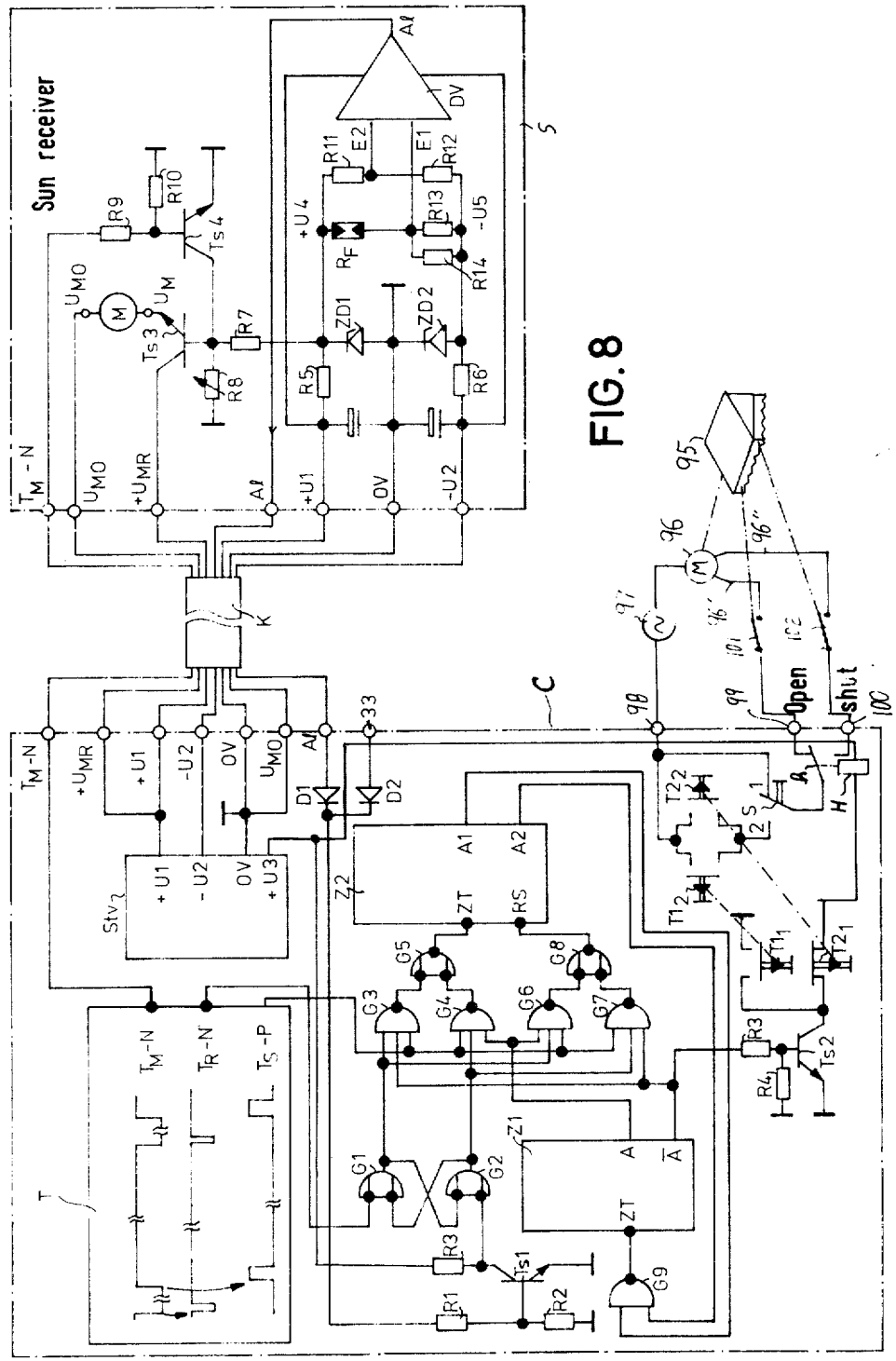
FIG. 8 is a schematic diagram of the control circuit of the embodiment of FIGS. 1 - 3.

FIG. 8 shows the circuit of the sunlight sensor S and of the controller C which are interconnected by a multiconductor cable K. All of the circuit elements of the sensor S except the sensor RF and bridge resistors R11–R14 are mounted on the board 16 (FIG. 1). The output line A1 of this unit is energized only when a sunny condition exists. This is effected in the following manner:

The bridge formed by photoresistor RF and resistors R11–R14 is connected to the two inputs E1 and E2 of a differential amplifier DV so that the voltage applied to input E2 equals:

$$U_4 - U_4 - (-U_5)/2$$

since R11 and R12 are of like resistance. In this manner if the light on photoresistor RF increases, its resistance will drop and the voltage applied to E1 will be greater than that applied to E2 to produce an output on line A1 indicating SUN, and vice versa to indicate SHADOW. The switching threshold of the amplifier DV whose hysterisis is approximately 1 mV is set by use of the adjustable resistor R14 with irradiation of the surface 12 by a calibration light which throws on the surface a quantity of light equal to the minimum amount of light that should trigger the device into a SUN output. Thus a light level on the surface 12 equivalent to 3,000 lux × cosα × cosβ is simulated. The bridge RF, R11–R14 is fed from a pair of voltage sources +U1 and −U2 in a power supply Stv in the controller C. These voltages are fed over resistors R5 and R6 and Zener diodes ZD1 and ZD2 so that they are regulated. Two ground lines Ov and $U_{Mo}$ return through the cable K to the supply Stv and to the controller C. A cable K of 20 meters or longer may be employed according to the present invention without adversely affecting the elements of the sensor S.

The controller C has a pulse generator T which produces three different outputs, namely:

$T_M$–N with a pulse width of 0.8 seconds and a height between 0.0V and 0.5V, and a pulse interval of 30 seconds with the level at +13V between pulses. This pulse is connected through the cable K to the motor M.

$T_R$–N with a pulse width of 200 nanoseconds and a height between 0.0V and 0.5V, and a pulse interval of 30 seconds with the level at +13V between pulses. This pulse train is formed by the logic circuit element produced by Texas Instruments under TTL series 15300 and is used to operate a gate G1.

$T_S$–P with a pulse width of 500 nanoseconds and a height of +13V and a pulse interval of 30 seconds, the level staying between 0.0V and 0.5V between pulses. This output is fed into gates G3, G4, G6 and G7.

When the device is actuated the pulse train $T_M$–N is effective through resistor R9 on the base of a transistor Ts4 whose emitter is grounded and whose collector is connected to the base of a switching transistor Ts3 whose collector is connected via a separator line to a voltage source +$U_{MR}$ identical to +U1. The emitter of this transistor Ts3 carries a voltage $U_M$ which is fed to one side of the motor M whose other side is connected to ground $U_{Mo}$. When the voltage level of pulse train $T_M$–N drops to 0V the transistor Ts4 is blocked and the transistor Ts3 is made conductive so that the shaded areas of pulse train $T_M$–N indicate periods when the motor M is turning and displacing the slits 10 and 11 past the surface 12. The resistors R7 and R8 feed a bias voltage to the transistor Ts3 such that $U_M$=0.6V and the motor M turns at a rate of 1 revolution per second. Base bias resistor R10 for transistor Ts3 is of very low resistance to allow the use of a very long cable K.

When a sunny condition prevails the differential amplifier DV produces a +12V output on line A1 which is fed through the diode D1 and a resistor R1 to the base of a transistor Ts1 whose emitter is grounded and whose collector is connected through a bias resistor R3 to a source +U3 and to one input of the gate G2 whose other input is connected to the output of the gate G1. The one input of this gate G1 is connected to the output of gate G2 and the other input is connected to the pulse generator T for pulse train $T_R$–N. The base of transistor Ts1 is biased by a resistor R2 of very low resistance like the resistor R10. Dots at the edges of circuit elements such as gates G1 and G2 indicate inverters.

Figure 9:
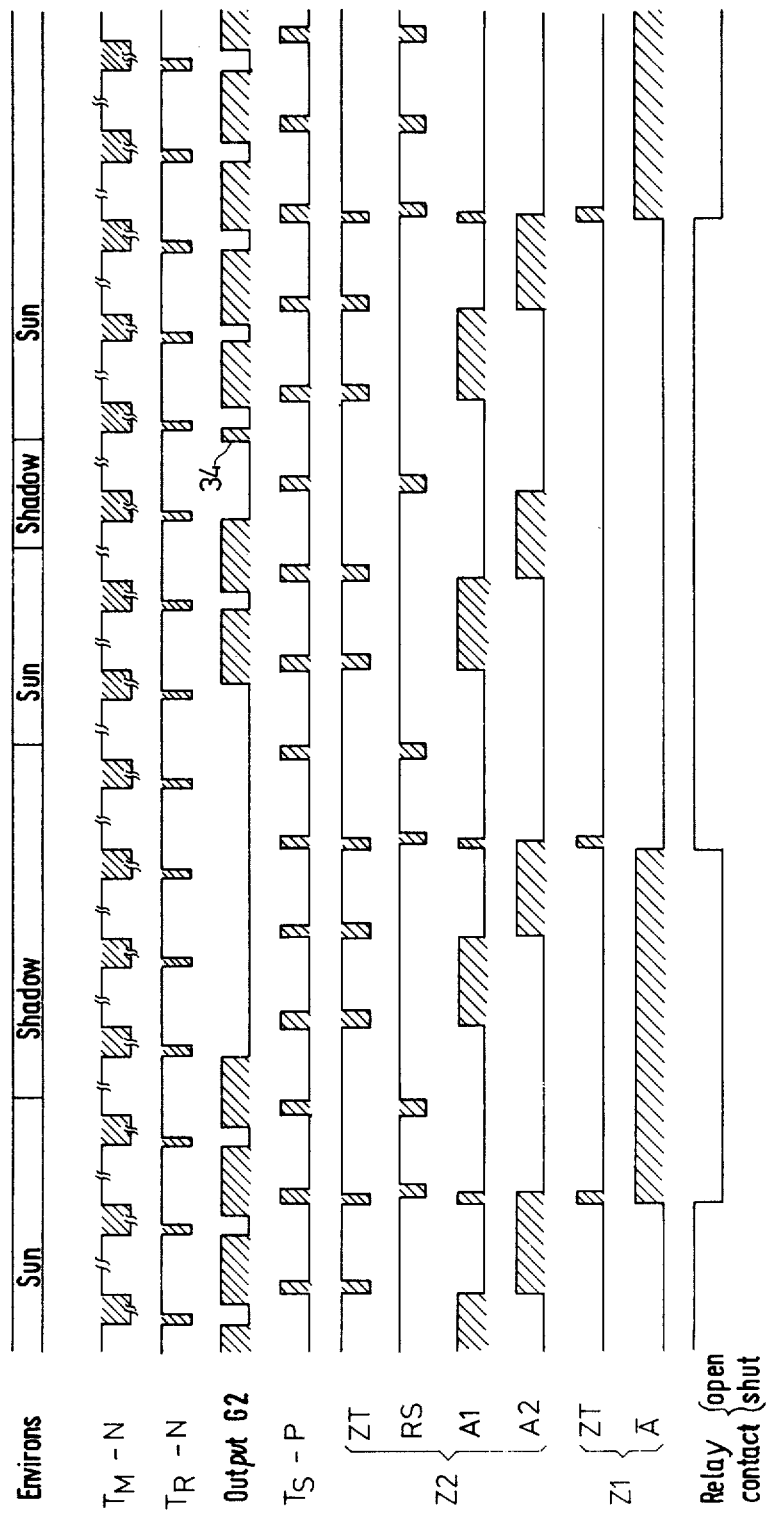
FIG. 9 is a pulse diagram illustrating the operation of the circuit of FIG. 8.

Gates G1 and G2 thus form a sort of flip-flop which has an output at the output of gate G1 when a shadowy condition prevails, or an output at the output of gate G2 when a sunny condition prevails (see FIG. 9). This output is changeable every 30 seconds when the pulse train $T_R$–N drops to zero, since this eliminates the one input to gate G1, and the other input to this gate will be 0 when there is insufficient sun. Thus, should a sunny condition change to a shadowy one, when the pulse train $T_R$–N drops the output of gate G1 will change to read 1. On the other hand in a shadowy condition with a 1 being fed by transistor Ts1 into the gate G2, a 0 will appear at this gate's output which becomes a 1 at the output of gate G1. Both gates G1 and G2 therefore cannot have outputs at the same time.

These outputs of gates G1 and G2, respectively, are fed into inputs of NAND gates G3, G6, and G4, G7, respectively. In addition each gate G3–G7 has another input connected to the generator T to receive the pulse train $T_S$–P. A monoflop Z1 has a pair of outputs A and Ā and a single input ZT and is so constructed as to have an output at one of the outputs until a signal is fed in at ZT, whereupon it will switch to the other output, and vice versa. The output A is connected to the third inputs of NAND gates G4 and G6 and corresponds to an open condition of the awning being controlled by the device and the output Ā is connected to the third inputs of NAND gates G3 and G7 and corresponds to a closed condition of the awning being controlled. The outputs of gates G3 and G4 are connected to the inputs of an OR gate G5 and the outputs of the gates G6 and G7 are connected to the inputs of another OR gate G8. In turn the output of these gates G5 and G8 are connected to inputs ZT' and RS of a two-stage counter or flip-flop Z2 having two outputs A1 and A2. This counter Z2 emits a pair of output signals if it receives continuously for 90 seconds an input signal from gate G5, thus after 90 seconds it will emit 1 signals at both outlets A1 and A2 which will be passed together by a NAND gate G9 through an inverter tino input ZT of flip-flop Z1, to move its output over from output A to output Ā. The operation is shown in the pulse diagram of FIG. 9 where pulse 34 indicates a brief sunny moment which falls on the surface 12 during the 1 interval of the pulse train $T_R$–N, so that this sunny moment has no effect on the apparatus other than that of producing a useless pulse at the output of gate G2.

Should other sensors S be desired, they need merely be connected in parallel with the sensor illustrated in FIG. 8, with the output A1 of the extra sensor being connected to a connnector 33 which feeds the signal in to the transistor Ts1 through another diode D2. With multiple sensors the resistors R2 and R10 must be increased in resistance, and the resistors R1 and R9 will also have to be changed.

The arrangement shown in FIG. 3 is used to operate an awning 95 which is connected to a motor 96 having two windings so that when operated an input line 96' it raises the awning 95 and when operated through an input line 96'' it lowers the awning 95. The other side of this motor 96 is connected to one side of a source 97 of electrical power whose other side is connected to a line terminal 98 on the controller C. The lines 96' and 96'' are connected to terminals 99 and 100 on this controller C. A relay H is connected between the voltage source +U3 and ground via a transistor Ts2 and switch contacts T2₁. This transistor Ts2 has a base biased through a resistor R4 and connected also via a restor R3 to the output Ā. The relay H has a pole member h which in an unactuated condition of the relay and with switch Sw in position 1 connects the motor 96 to the UP terminal 99, and to the DOWN terminal 100 when the relay H is actuated. Thus switch position 1 is used for automatic operation of the motor M which is also connected to the conventional limit switches 101 and 102 to shut off the motor 96 when the awning 95 is all the way up and all the way down, respectively.

Switches T1₁,₂ and T2₁,₂ serve to operate the awning manually by overriding the automatiic controller. On depression of switch T1₁,₂ to lower the awning 95, the collector of transistor Ts2 is connected to ground and relay pole h is connected to the line terminal 98 so as to close the relay H regardless of whether there is an output on line Ā. When switch T2₁,₂ is closed it completely disconnects the relay H from ground and connects the pole h to the line, thereby opening the awning 95.

Figure 11:
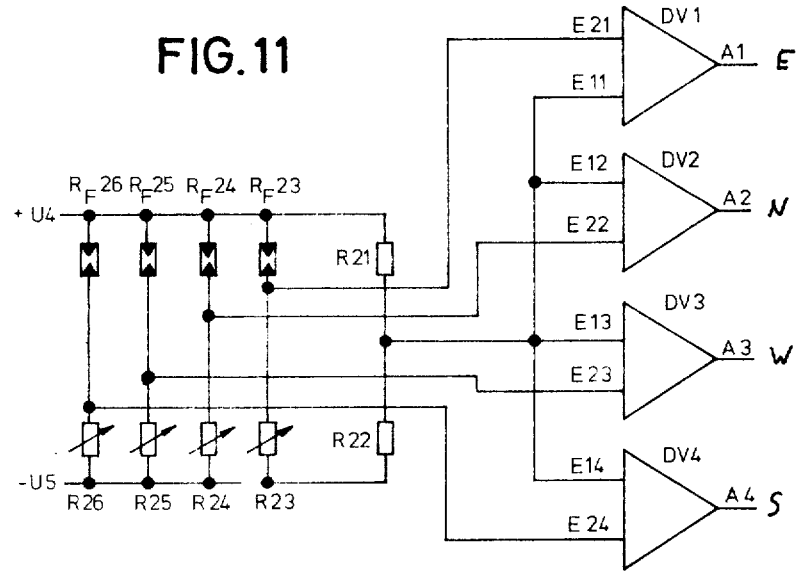
Figure 12:
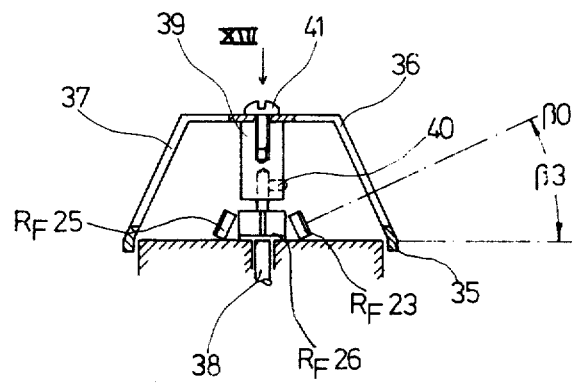
FIG. 12 is a vertical section through a second embodiment of the present invention.
Figure 13:
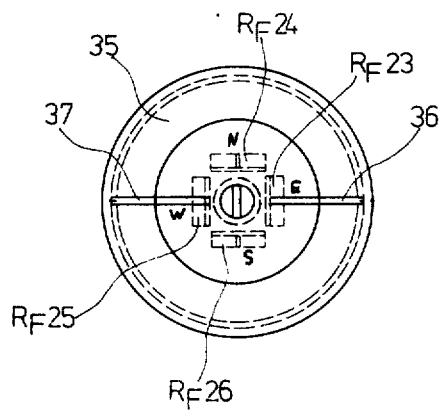
FIG. 13 is a view taken in the direction of arrow XIII of FIG. 12.

FIGS. 11, 12, and 13 show another embodiment of the present invention wherein it is possible to sweep an angle of 180° or more, which is possible according to this invention by reducing the horizontal width of the sensing slit. In this arrangement, however, four photosensitive elements $R_F$23–26 are arranged spaced 90° apart about an upright axis defined by a shaft 38 of a motor. A screw 40 secures a hub 39 to which a cup-like cover 35 is secured by means of a screw 41. The cover 35 is formed as a frustocone and has a pair of diagonally opposite slits 36 and 37 which are formed to open much as the slits 10 and 11 of FIGS. 1–3.

If such a device is set up to scan the North, South, East and West sides of a building, as shown in FIG. 13, it can be connected as shown in FIG. 11 to operate separate sets of shutters. To this end each sensor $R_F$23–26 is connected in series with a respective variable resistor R23–26 and the junction is connected to one input E1-1–E14 of a respective differential amplifier DF1-4 having a respective output A1-4. The other inputs E21–24 of these amplifiers DV1-4 are connected between a pair of like resistors R21 and R22 which are connected bridge-fashion across the terminals +U4 and –U5 like the resistors $R_F$23–26 and R23–26.

Figure 10:
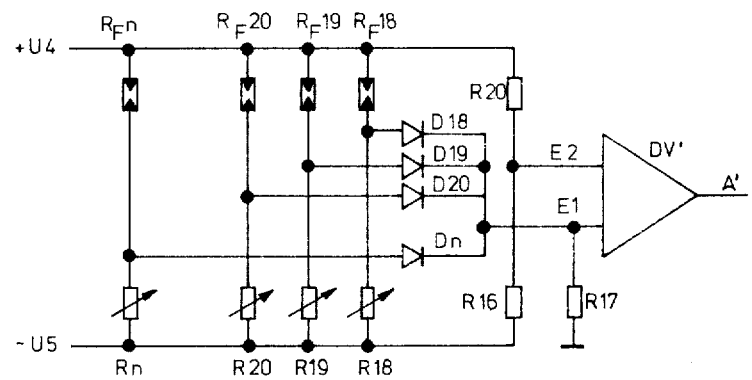
FIGS. 10 and 11 show alternate circuits usable for a plurality of sunlight sensors.

It is also possible, as shown in FIG. 10, to mount a plurality of photoresistors $R_F$18–n in series with respective bridge resistors F18–n and in parallel to like resistors R16 and R20 to inputs E1 and E2 of a differential amplifier DV' having an output A' with the input E1 connected to ground through a resistor R17. The junctions of the photoresistors $R_F$18–n and the resistors R18–n are connected via respective diodes D18–n to the input E1 so that the different light intensities will be averaged out and the output A' will correspond to their mean value.

Figure 14:
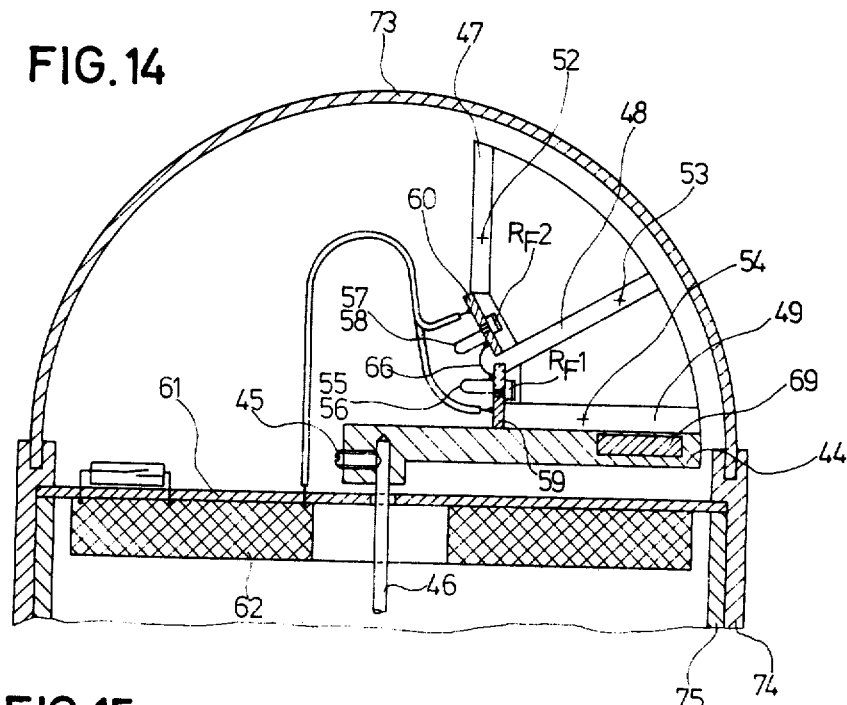
FIG. 14 is a vertical section through a third embodiment of this invention.
Figure 15:
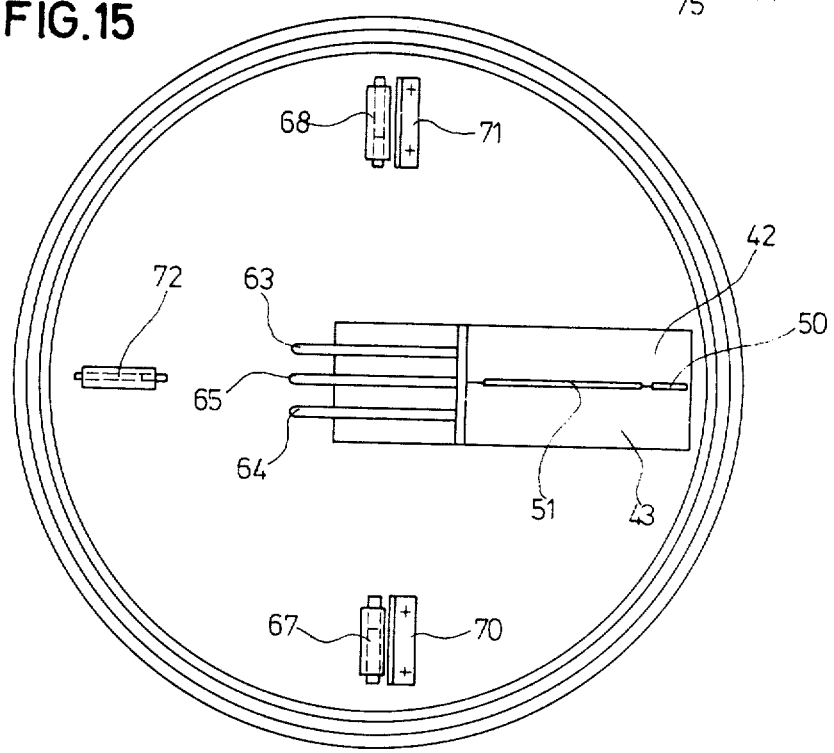
FIG. 15 is a top view of the embodiment of FIG. 14.

FIGS. 14 and 15 show a sensing head 42 comprising a rotatable arm 44 secured by a screw 45 to a vertical motor shaft 46 for rotation of this arm 44 about the axis defined by the shaft 46. Terrace-like raised portions 47–48 frame two 0.3 mm wide photoresistors $R_F$1 and $R_F$2 and a roof 43 formed with a pair of 0.6 mm wide slits 50 and 51 covers these elements, which are mounted on respective circuit boards 59 and 60. The cover 43 is secured at 52, 53 and 54 to the regions 47, 48, and 49 respectively. Connection wires 55, 56, and 57, 58 are soldered to the boards 59 and 60 and connected via flexible wires 63–65 to circuitry 62 potted under a fixed base board 61 underneath the arm 44, with a wire 66 connecting together the ground sides of the photoresistors $R_F$1 and 2.

The arm 44 is provided with a permanent magnet 69 which operates switches 67 and 68 after passing ferromagnetic strips 70 and 71 which only allow the magnet 69 to be effective on the switches 67 and 68 when it is directly above them. These switches 67 and 68 serve to reverse the motor rotation direction to sweep approximately, 180° with the head 42 and prevent the wires 63–64 from being twisted off. Another reed switch 72 is provided between the switches 67 and 68 to shut the motor down completely in case it turns the head 42 past one of the switches 67 and 68. Thus it is impossible for the motor to drive the device through more than 270°.

The head 42 rotates within a transparent hemispherical dome 73 held in a support ring 74 in which another ring 75 clamps the board 61 tight. Such an arrangement is useful to tell how high the sun is, since it is sometimes desirable to close venetian blinds, for instance, with a weak flat morning or evening sun, whereas a much stronger but perpendicular daylight sunlight would be less objectionable.

We claim:

1. The combination with a load comprising a motor and a sun shield of the jalousie, window blind, awning and like type driven by said motor, of a sunlight detector for controlling said load and comprising:

sensing means having a photosensitive surface for emitting an electrical output on irradiation of said surface by light;

a housing surrounding said surface and having an annular displaceable wall formed parallel to said surface with a generally vertically elongated slit-like window constituting the only light entrance into said housing;

means for angularly displacing said wall and thereby displacing said slit transversely to itself about an upright axis and at a constant distance from said surface through an angle of at least 150°; and means connecting said sensing means and said load for operating said load according to said output.

2. The combination defined in claim 1, further comprising a fixed support, said surface being planar and carried on said support.

3. The combination defined in claim 2 wherein said window is vertically elongated and said means displaces said wall horizontally.

4. The combination defined in claim 3 wherein said wall is a body of revolution having an axis at said surface, said means for displacing serving to rotate said wall about said axis.

5. The combination defined in claim 4 wherein said wall is cylindrical and is formed with a pair of such slit-like windows diametrically apart.

6. The combination defined in claim 3 wherein said wall is a body of revolution having an axis, said means for displacing serving to rotate said wall about said axis.

7. The combination defined in claim 6, further comprising a plurality of such surfaces angularly equispaced about said axis.

8. The combination defined in claim 7 wherein said axis is vertical and said slit-like window is vertically elongated.

9. The combination defined in claim 1 wherein said window is open at most 3° relative to said surface.

10. The combination defined in claim 1, further comprising a displaceable support, said surface and said wall being fixedly mounted on said support.

11. The combination defined in claim 10 wherein said support is rotatable about an upright axis, said means for displacing being effective to rotate said support about said upright axis.

12. The combination defined in claim 11 wherein said wall is formed with a second such slit-like window above the first-mentioned window, said detector further comprising a second surface on said support and a partition between said windows and said surfaces, whereby light from said first window falls only on the first-mentioned surface and light from said second window only falls on said second surface.

* * * * *